Nov. 10, 1942.  W. C. KNEPPER  2,301,289
GRAPEFRUIT CUTTER
Filed March 24, 1942  2 Sheets-Sheet 1
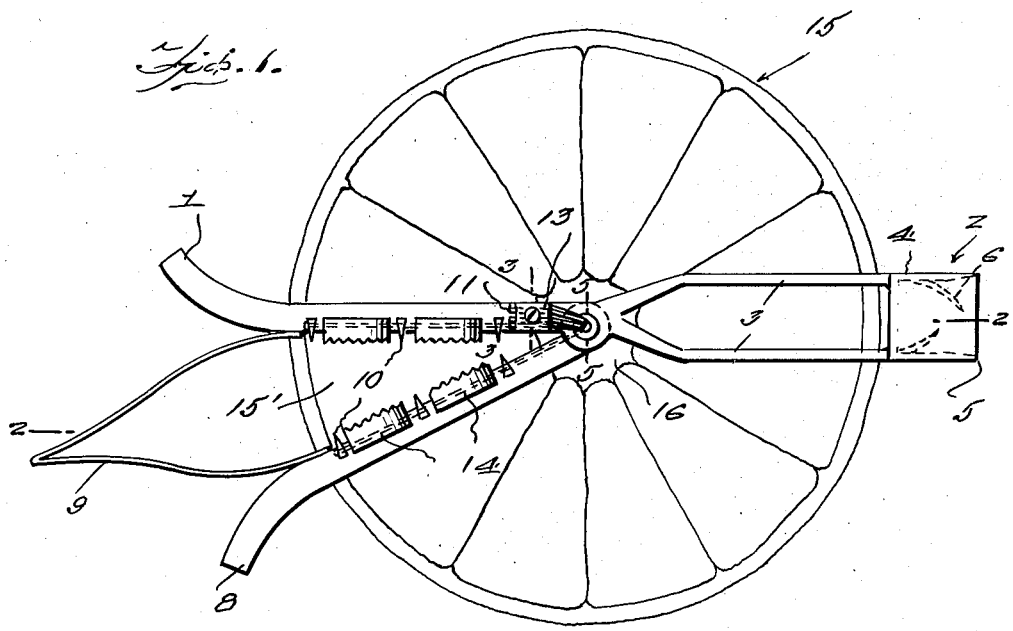
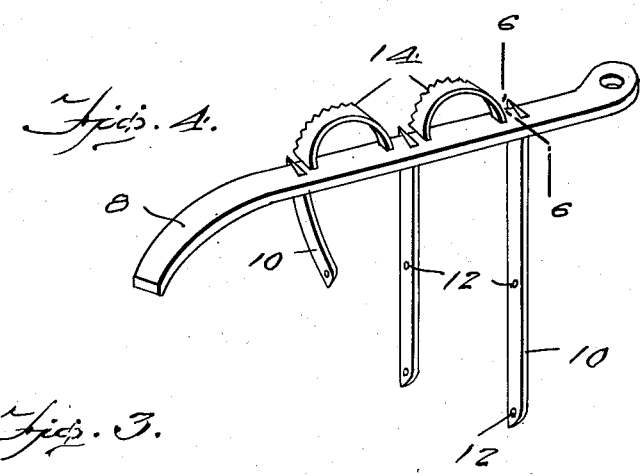
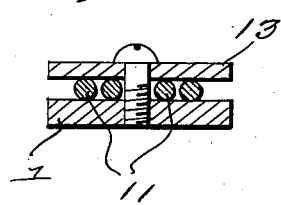
Inventor
William C. Knepper
By Clarence A. O'Brien
and Harvey B. Jacobson
Attorneys Nov. 10, 1942.   W. C. KNEPPER   2,301,289
GRAPEFRUIT CUTTER
Filed March 24, 1942   2 Sheets-Sheet 2
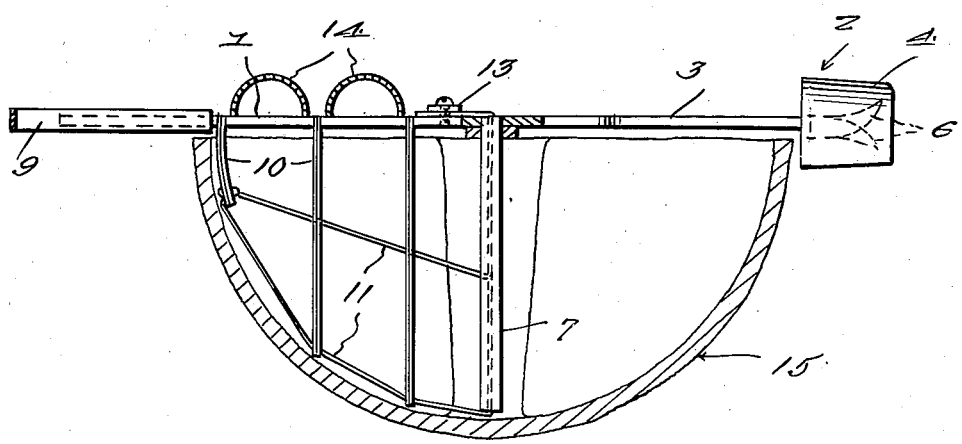
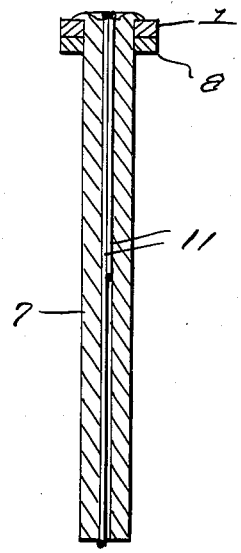
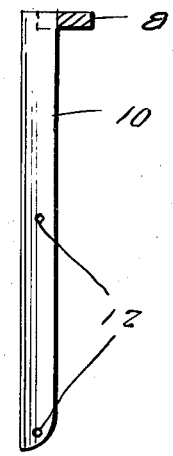
Inventor
William C. Knepper Patented Nov. 10, 1942

2,301,289

UNITED STATES PATENT OFFICE 2,301,289

GRAPEFRUIT CUTTER

William C. Knepper, Asheville, N. C.

Application March 24, 1942, Serial No. 436,037

2 Claims. (Cl. 146—3)

The present invention relates to new and useful improvements in grapefruit cutters, and has for its primary object to provide, in a manner as hereinafter set forth, a device of this character comprising a novel combination and arrangement for coring a half of a grapefruit, severing the segments from the rind and dicing or cutting said segments into pieces, and then scalloping the edges of the grapefruit.

Other objects of the invention are to provide a combination grapefruit tool of the aforementioned character which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view, showing a device constructed in accordance with the present invention in use.

Figure 2 is a vertical sectional view, taken substantially on the line 2—2 of Figure 1.

Figure 3 is a detail view in cross-section, taken substantially on the line 3—3 of Figure 1.

Figure 4 is a detail view in perspective of the pivoted handle and the cutting elements mounted thereon.

Figure 5 is a cross-sectional view, taken substantially on the line 5—5 of Figure 1.

Figure 6 is a cross-sectional view, taken substantially on the line 6—6 of Figure 4.

Referring now to the drawings in detail, it will be seen that the embodiment of the invention which has been illustrated comprises a fixed handle 1 of suitable metal. Projecting longitudinally from one end of the handle 1 is a corer 2. The corer 2 includes a pair of legs 3 which are integral with the handle 1. On the outer ends of the legs 3 is a tube 4 the free end of which is formed to provide a circular cutting edge 5. Spiral core cutting and lifting blades 6 are provided in the tube 4.

Fixed on the inner end portion of the handle 1 is a center tube 7. Journaled on the center tube 7 immediately adjacent the handle 1 is a pivoted handle 8. A substantially V-shaped spring 9 is provided for opening the handles 1 and 8.

Depending from the handles 1 and 8 is a plurality of knives 10 which, it will be observed, progressively increase in length toward the inner ends of said handles. It will also be noted that the cutting edges of the knives 10 on the handles 1 and 8 are opposed. Cutting wires 11 extend between the series of knives 10 on each of the handles 1 and 8. The knives 10 have formed therein holes 12 through which the cutting wires 11 pass. The wires 11 enter the center tube 7 and pass upwardly therethrough and have one end portion firmly secured to the handle 1 through the medium of a suitable clip or clamp 13.

Also mounted on the handles 1 and 8 are pairs of substantially semi-circular, coacting toothed scalloping knives 14. It will be noted that two of the knives 14 are provided on each of the handles. A half of a grapefruit is designated by reference numeral 15 in Figures 1 and 2 of the drawings.

It is thought that the manner in which the device is used will be readily apparent from a consideration of the foregoing. Briefly, the half of a grapefruit, after it has been cut, is placed on a suitable support and the core is removed therefrom through the medium of the corer 2. After the core has been cut and lifted out, it may be conveniently removed from between the legs 3. The device is then positioned substantially diametrically across the grapefruit and the knives 10, with the wires 11 thereon, are forced downwardly on opposite sides of one of the grapefruit segments 15'. When this is done, the center tube 7 is engaged in the space 16 in the grapefruit from which the core has been removed. The handles 1 and 8 are then closed against the tension of the spring 9 in a manner to cause the knives 10 and the wires 11 to sever the segment therebetween from the rind and simultaneously cut said segment into a plurality of pieces. This operation is repeated until all of the segments have been severed from the rind and cut up. The device is then turned over and the knives 14 are worked around the peripheral edge portion of the rind for scalloping same, after which the grapefruit is ready to be served.

It is believed that the many advantages of a grapefruit cutter constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A grapefruit cutter of the character described comprising a pair of elongated handles pivotally connected at one end, a series of parallel knives on each handle at right angles thereto, and cutting wires extending between the knives comprising each series.

2. A grapefruit cutter of the character described comprising an elongated handle, a tube depending from one end portion of said handle at right angles thereto, another elongated handle journaled on said tube at right angles thereto immediately adjacent the first-named handle, resilient means yieldingly urging the handles apart, a series of knives depending from each handle parallel to each other and to the tube, a plurality of cutting wires extending between the knives comprising each series, said cutting wires passing through the tube, and means for securing one end portion of the cutting wires to the first-named handle.

WILLIAM C. KNEPPER.